(12) United States Patent
Tamulewicz

(10) Patent No.: US 12,498,082 B2
(45) Date of Patent: Dec. 16, 2025

(54) STABILIZATION MECHANISMS AND METHODS OF MANUFACTURE

(71) Applicant: PETSMART HOME OFFICE, INC., Phoenix, AZ (US)

(72) Inventor: Paul Anthony Tamulewicz, Glendale, AZ (US)

(73) Assignee: PETSMART HOME OFFICE, INC., Phoenix, AZ (US)

( * ) Notice: Subject to any disclaimer, the term of this patent is extended or adjusted under 35 U.S.C. 154(b) by 297 days.

(21) Appl. No.: 18/208,193

(22) Filed: Jun. 9, 2023

(65) Prior Publication Data

US 2024/0410519 A1    Dec. 12, 2024

(51) Int. Cl.
F16M 11/22    (2006.01)
B65D 83/00    (2006.01)

(52) U.S. Cl.
CPC ............ *F16M 11/22* (2013.01); *B65D 83/00* (2013.01)

(58) Field of Classification Search
CPC ...................................... F16M 11/22
USPC ....... 222/185.1; 220/636; 248/188.1, 346.01, 248/188.8
See application file for complete search history.

(56) References Cited

U.S. PATENT DOCUMENTS

| | | | | |
|---|---|---|---|---|
| 2,315,473 A | * | 3/1943 | Wolcott | G01F 11/24 141/340 |
| 3,061,152 A | * | 10/1962 | Safianoff | A47J 47/04 222/88 |
| 3,085,718 A | * | 4/1963 | Nelson | A47F 1/08 222/437 |
| 3,123,257 A | * | 3/1964 | Miller | A47G 29/093 D7/619.1 |
| 3,720,184 A | * | 3/1973 | Pearce | A01K 5/0225 119/51.5 |
| 4,034,715 A | * | 7/1977 | Arner | A01K 5/0225 119/51.5 |
| 4,270,490 A | * | 6/1981 | Kopp | A01K 5/0114 119/61.5 |
| 4,315,483 A | * | 2/1982 | Scheidler | A01K 5/0291 119/51.5 |
| 4,573,434 A | * | 3/1986 | Gardner | A01K 7/02 119/77 |
| 4,721,063 A | * | 1/1988 | Atchley | A01K 5/0114 D30/132 |
| 4,840,143 A | * | 6/1989 | Simon | A01K 5/0225 43/131 |

(Continued)

FOREIGN PATENT DOCUMENTS

CN         207948541 U    10/2018

*Primary Examiner* — Paul R Durand
*Assistant Examiner* — Michael J. Melaragno
(74) *Attorney, Agent, or Firm* — BRYAN CAVE LEIGHTON PAISNER LLP

(57) ABSTRACT

An apparatus is disclosed that includes a base portion comprising a retention device including at least one opening; and at least one stabilization mechanism, wherein each of the at least one stabilization mechanism comprises a connection element and a support element, wherein the connection element has a shape configured to be positioned in the at least one opening, and wherein the at least one stabilization mechanism provides stability for the apparatus when the at least one stabilization mechanism is deployed to a first position to expand a footprint of the apparatus. Other embodiments are disclosed.

22 Claims, 13 Drawing Sheets

(56) References Cited

U.S. PATENT DOCUMENTS

| | | | | |
|---|---|---|---|---|
| 5,016,572 A * | 5/1991 | Weber | A01K 5/0225 | 119/52.1 |
| 5,207,182 A * | 5/1993 | Lorenzana | A01K 7/02 | 119/77 |
| 5,259,336 A * | 11/1993 | Clark | A01K 7/00 | 119/51.5 |
| 5,388,792 A * | 2/1995 | Hastings | G06F 1/181 | 248/188.8 |
| 5,488,927 A * | 2/1996 | Lorenzana | A01K 7/02 | 119/51.5 |
| 5,758,599 A * | 6/1998 | Glanville | A01K 7/02 | 119/77 |
| 5,848,736 A * | 12/1998 | Boumann | B67D 3/0032 | 222/481.5 |
| 5,881,670 A * | 3/1999 | Pelsor | A01K 5/0135 | 119/61.54 |
| 6,055,932 A * | 5/2000 | Weber | A01K 5/0114 | 119/52.1 |
| 6,079,361 A * | 6/2000 | Bowell | A01K 7/02 | 119/72 |
| 6,142,099 A * | 11/2000 | Lange, Jr. | A01K 7/02 | 119/51.5 |
| 6,142,101 A * | 11/2000 | Pelsor | A01K 5/0135 | 119/61.54 |
| 6,467,428 B1 * | 10/2002 | Andrisin | A01K 5/0114 | 119/51.5 |
| 6,604,648 B2 * | 8/2003 | Immerman | A47G 19/2261 | 220/636 |
| 6,845,735 B1 * | 1/2005 | Northrop | A01K 5/0114 | 222/410 |
| 6,863,025 B2 * | 3/2005 | Ness | A01K 5/0114 | 119/51.5 |
| 7,040,249 B1 * | 5/2006 | Mushen | A01K 5/0225 | 119/51.5 |
| 7,114,694 B2 * | 10/2006 | Li | F16M 11/18 | 312/351.9 |
| 7,550,668 B2 * | 6/2009 | Chen | H05K 5/0234 | 174/559 |
| 7,733,645 B2 * | 6/2010 | Hsu | F16M 11/08 | 248/188.8 |
| 7,926,413 B2 * | 4/2011 | Hart | A47J 31/4403 | 399/306 |
| 8,087,547 B1 * | 1/2012 | Lindsey | B65D 35/56 | 222/173 |
| 8,186,304 B2 | 5/2012 | Harper | | |
| 8,196,779 B1 * | 6/2012 | Czarnecki | B67D 3/0029 | 222/181.1 |
| 8,245,665 B2 * | 8/2012 | Willett | A01K 5/0142 | 119/51.5 |
| 8,387,566 B2 * | 3/2013 | Graves | A01K 7/005 | 119/51.01 |
| 8,448,603 B2 | 5/2013 | Northrop et al. | | |
| 8,555,816 B2 | 10/2013 | Weber et al. | | |
| D703,392 S | 4/2014 | Desberg | | |
| 8,807,082 B1 * | 8/2014 | Alfonso | A01K 5/0142 | 119/51.5 |
| 9,033,194 B1 * | 5/2015 | Grabowski | B65D 83/04 | 222/568 |
| 9,414,568 B2 * | 8/2016 | Veness | A01K 5/0275 | |
| 9,560,833 B2 * | 2/2017 | Qiu | A01K 7/00 | |
| D786,083 S | 5/2017 | Baker et al. | | |
| D786,084 S | 5/2017 | Kachar et al. | | |
| 9,907,291 B2 * | 3/2018 | Lathim | A01K 5/0225 | |
| 9,930,866 B2 * | 4/2018 | Deritis | A01K 5/0291 | |
| 9,974,279 B2 | 5/2018 | Northrop et al. | | |
| D882,881 S | 4/2020 | Gevaert | | |
| 10,609,899 B2 | 4/2020 | Veness | | |
| 10,687,511 B2 | 6/2020 | Gevaert | | |
| 11,375,691 B2 * | 7/2022 | Pyzyna | B67D 3/0061 | |
| 11,446,584 B2 * | 9/2022 | Yang | A63H 33/28 | |
| 2003/0098310 A1 * | 5/2003 | McGee | A01K 5/0114 | 220/574.3 |
| 2003/0192480 A1 * | 10/2003 | Bennett | A01K 5/0128 | 119/61.5 |
| 2004/0118356 A1 * | 6/2004 | Krishnamurthy | A01K 7/025 | 119/74 |
| 2005/0051685 A1 * | 3/2005 | Wu | G06F 1/181 | 248/188.8 |
| 2006/0174838 A1 * | 8/2006 | Plante | A01K 7/02 | 119/74 |
| 2006/0201434 A1 * | 9/2006 | Kujawa | A01K 7/00 | 119/61.5 |
| 2007/0261641 A1 * | 11/2007 | Manley-Hood | A01K 5/0128 | 119/61.5 |
| 2008/0078330 A1 * | 4/2008 | McCallum | A01K 7/02 | 119/72 |
| 2010/0275852 A1 * | 11/2010 | Lipscomb | A01K 5/0114 | 119/61.5 |
| 2011/0247565 A1 * | 10/2011 | Northrop | A01K 5/0135 | 119/61.54 |
| 2012/0017837 A1 * | 1/2012 | Crawford | A01K 5/0114 | 119/61.1 |
| 2012/0104214 A1 * | 5/2012 | St. Jacques | A01K 5/0135 | 248/346.5 |
| 2012/0210941 A1 * | 8/2012 | Brown | A01K 7/005 | 119/61.52 |
| 2012/0305598 A1 * | 12/2012 | Costello | B67C 9/00 | 248/346.07 |
| 2013/0334377 A1 * | 12/2013 | Lee | A01K 5/0114 | 248/146 |
| 2016/0219832 A1 * | 8/2016 | Langston | A01K 5/0142 | |
| 2017/0245465 A1 * | 8/2017 | Oates | B65D 21/0234 | |
| 2017/0280675 A1 * | 10/2017 | Macneil | A01K 5/0135 | |
| 2018/0014505 A1 * | 1/2018 | Macneil | A01K 5/0135 | |
| 2018/0020637 A1 * | 1/2018 | Macneil | A01K 7/005 | 119/61.54 |
| 2018/0242553 A1 * | 8/2018 | Németh | B65D 77/2068 | |
| 2022/0295742 A1 * | 9/2022 | Pratt | A01K 7/02 | |
| 2023/0189754 A1 * | 6/2023 | Stone | A01K 5/0114 | 119/61.57 |
| 2024/0410519 A1 * | 12/2024 | Tamulewicz | F16M 11/22 | |

\* cited by examiner

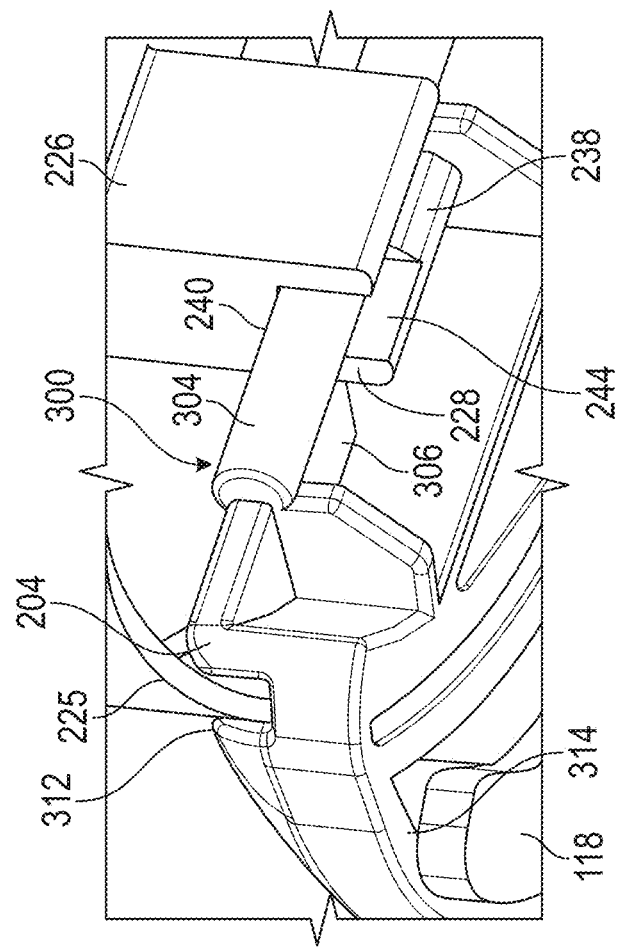
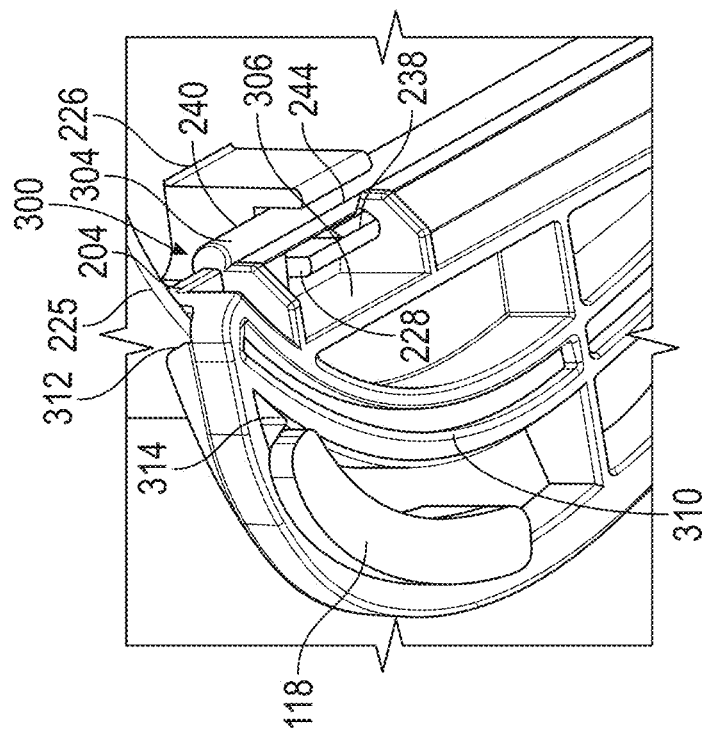
FIG. 3D
FIG. 3C

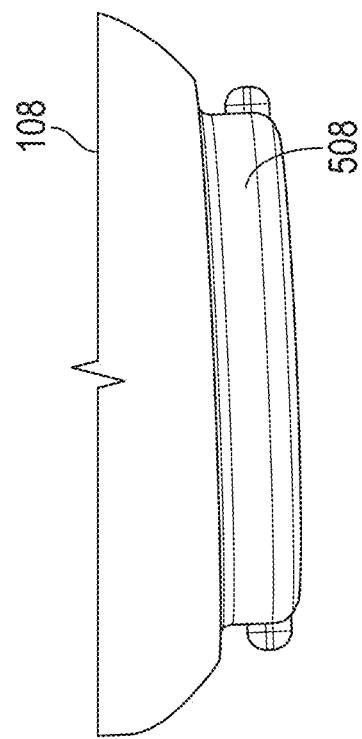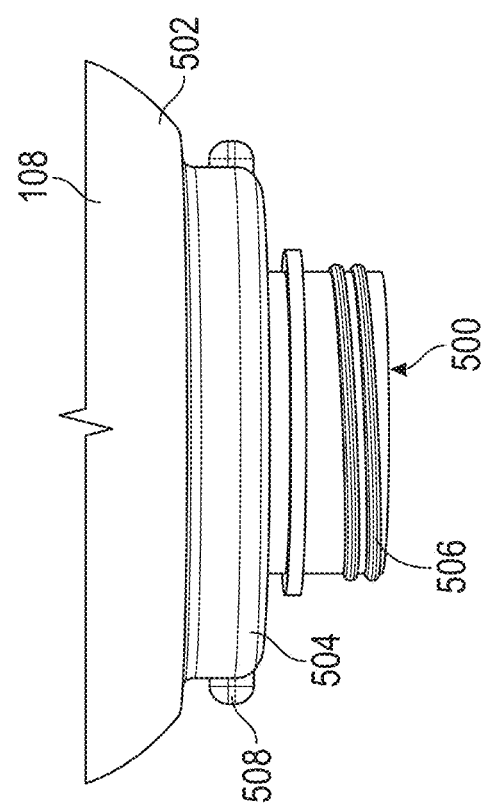

STABILIZATION MECHANISMS AND METHODS OF MANUFACTURE

TECHNICAL FIELD

This disclosure relates generally to stabilization mechanisms, more particularly a method of use and manufacture for stabilization mechanisms.

BACKGROUND

Gravity dispensers for food or other liquids operate by inverting a container housing the food or liquid and dispenses the food or liquid into a tray or bowl. Often times, the container is heavy when it is initially filled and can weigh more than the tray or bowl that is receiving the food or liquid. In scenarios where the gravity dispensers are used for pets, the pet can knock over the gravity dispenser if it bumps into the container due to the imbalance in weight between the container and the tray or bowl. As such, there is a need to provide improved stability to the gravity dispensers to mitigate them from being knocked over.

BRIEF DESCRIPTION OF THE DRAWINGS

To facilitate further description of the embodiments, the following drawings are provided in which:

FIG. 3C illustrates a bottom view of a portion of the stabilization mechanism of FIG. 1A coupled to the retention device of FIG. 2E, according to an embodiment;

FIG. 3D illustrates an alternate bottom view of the stabilization mechanism of FIG. 1A coupled to the retention device of FIG. 2E, according to an embodiment;

FIG. 5A illustrates a side view of a bottom portion of the container of FIG. 1A, according to an embodiment;

FIG. 5B illustrates a side view of an alternative embodiment of a bottom portion of the container of FIG. 1A, according to an embodiment;

Figure 1B:
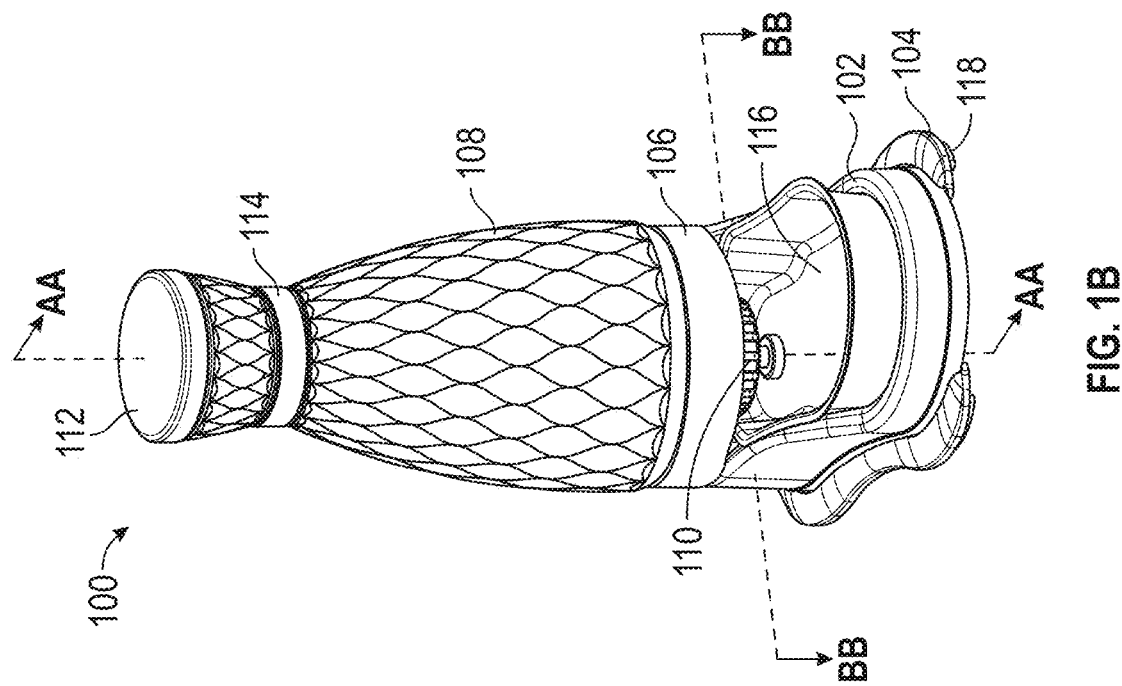
FIG. 1B illustrates an assembled view of the exemplary dispenser of FIG. 1A, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Coupling may be for any length of time, e.g., permanent or semi-permanent or only for an instant. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

Various embodiments are directed to a stabilization mechanism and methods of manufacture. Embodiments disclosed herein are directed to an apparatus comprising a base portion comprising a retention device including at least one opening; and at least one stabilization mechanism, wherein each of the at least one stabilization mechanism comprises a connection element and a support element, wherein the connection element has a shape configured to be positioned in the at least one opening, and wherein the at least one stabilization mechanism provides stability for the apparatus when the at least one stabilization mechanism is deployed to a first position to expand a footprint of the apparatus.

Embodiments disclosed herein are directed to a method of manufacturing an apparatus. In some embodiments, the method comprises providing a base portion comprising a retention device including at least one opening; and providing at least one stabilization mechanism, wherein each of the at least one stabilization mechanism comprises a connection element and a support element, wherein the connection element has a shape configured to be positioned in the at least one opening, and wherein the at least one stabilization mechanism provides stability for the apparatus when the at least one stabilization mechanism is deployed to a first position to expand a footprint of the apparatus.

Embodiments disclosed herein address the common problem of a food or liquid dispenser falling over. Traditional dispenser do not include stabilization mechanisms which can often lead to the apparatus falling over, spilling food, or breaking on impact. Embodiments disclosed herein are directed to a significant improvement over existing dispensers by improving stabilization.

As evidenced by this disclosure, the stabilization mechanism can be customizable, with a range of adjustable features that allow the user to tailor to their specific needs. The stabilization mechanism is intuitive to use and can be adjusted with minimal effort, allowing the user to quickly and easily increase the stability of their dispenser.

Figure 1A:
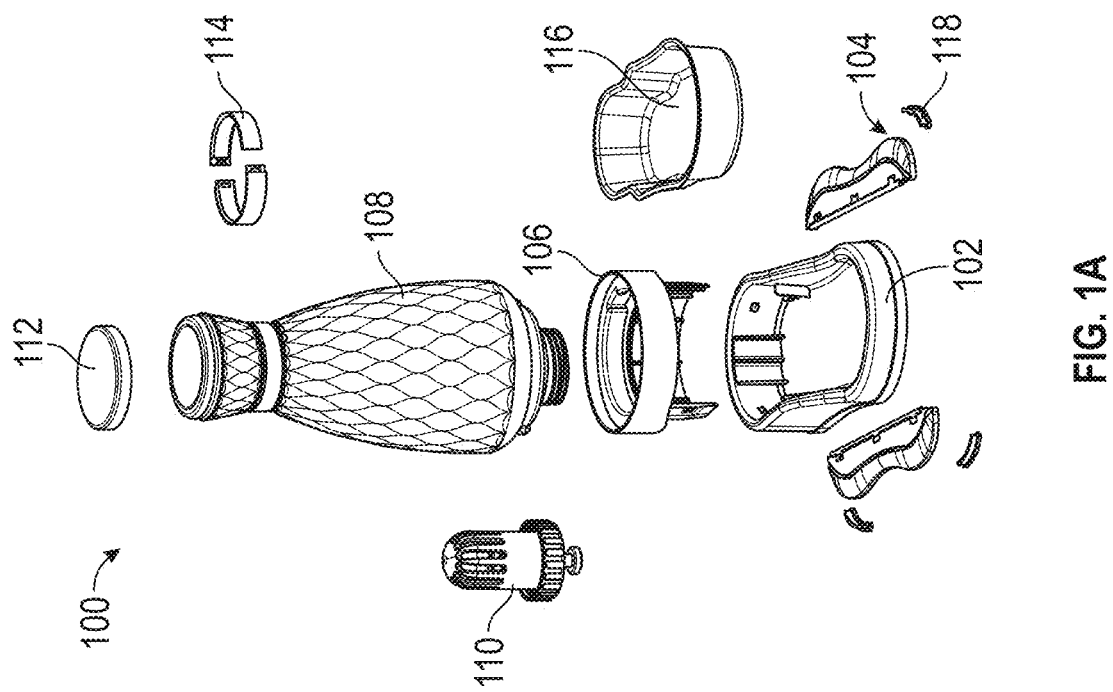
FIG. 1A illustrates an exploded view of an exemplary dispenser, according to an embodiment.

Turning to the drawings, FIG. 1A illustrates an exemplary dispenser 100 in an exploded view and FIG. 1B illustrates the exemplary dispenser 100 in an assembled view. The dispenser 100 of the illustrated embodiments comprises a base portion 102, a stabilizing mechanism 104, an adapter 106, a container 108, a dispenser mechanism 110, a lid 112, a collar 114, a tray 116, and a retention mechanism 118. The lid 112 is adapted to be coupled to the container 108 to contain food or liquid, and the collar 114 is adapted to be coupled to the container 108 to assist a user with holding the container 108.

Figure 2A:
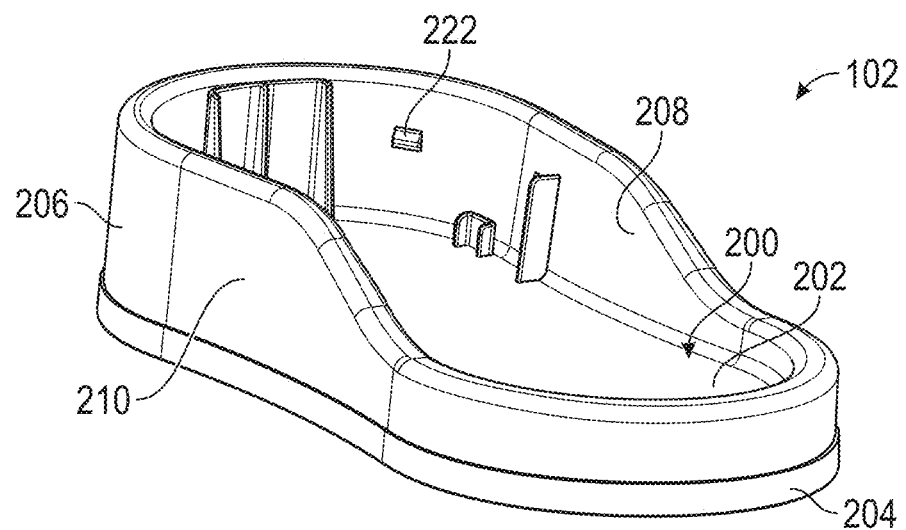
FIG. 2A illustrates a top, front, left perspective view of the base portion of FIG. 1A, according to an embodiment.
Figure 2B:
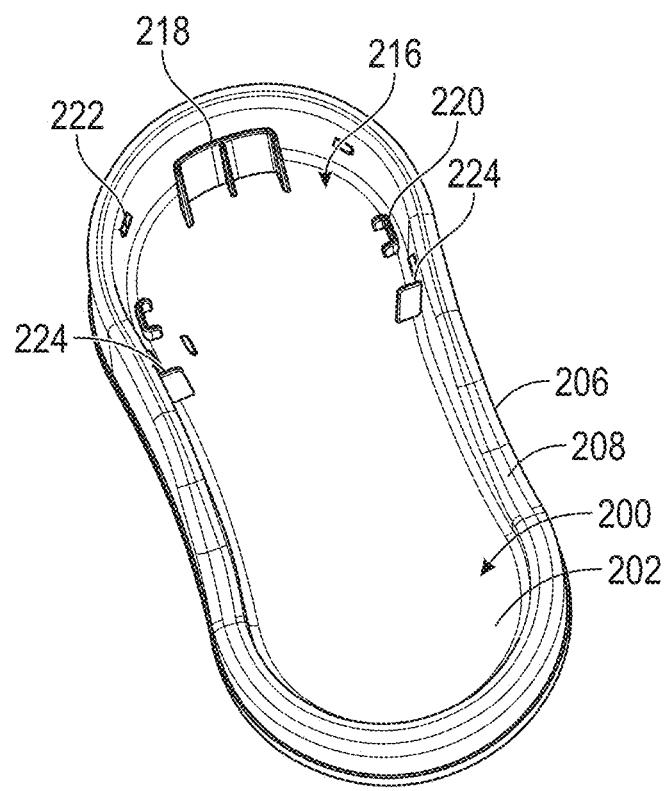
FIG. 2B illustrates a different top, front, left perspective view of the base portion of FIG. 1A, according to an embodiment.
Figure 2C:
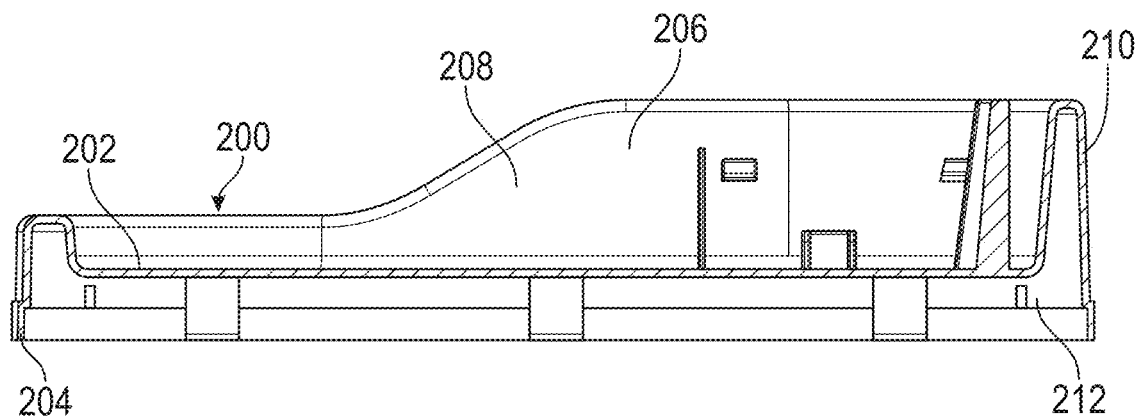
FIG. 2C illustrates a cross-sectional view of the base portion of FIG. 1A along section line AA (shown in FIG. 1B), according to an embodiment.
Figure 2D:
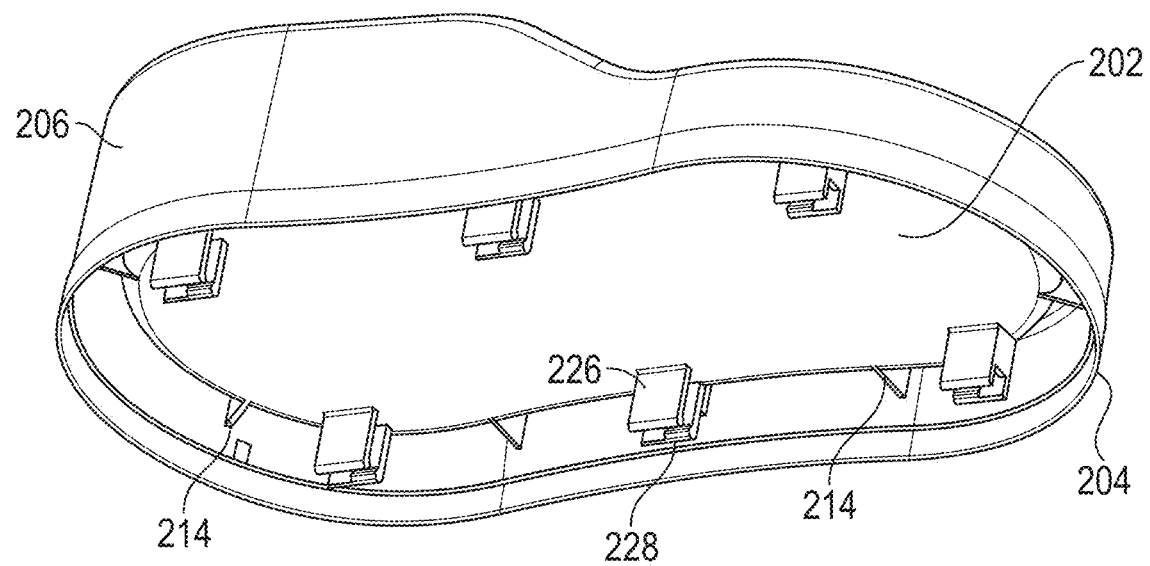
FIG. 2D illustrates a bottom, front, left perspective view of the base portion of FIG. 1A, according to an embodiment.
Figure 2E:
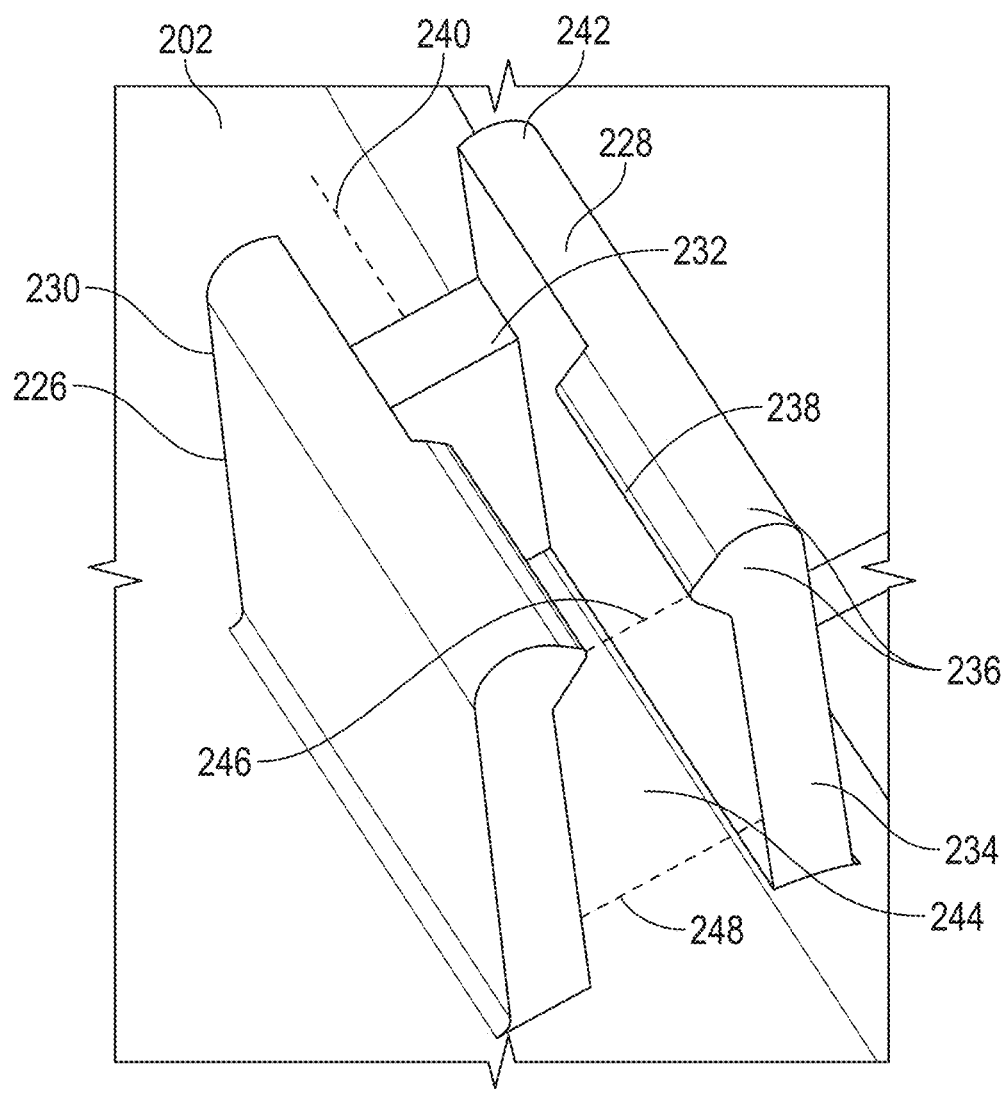
FIG. 2E illustrates the retention device of the base portion of FIG. 1A, according to an embodiment.

Turning to FIGS. 2A-2E, various views of the base portion 102 are illustrated. In particular, FIG. 2A illustrates a top, front, left perspective view of the base portion 102 of FIG. 1A, FIG. 2B illustrates a different, top, front, left perspective view of the base portion 102 of FIG. 1A, FIG. 2C illustrates a cross-sectional view of the base portion 102 of FIG. 1A along section line AA (shown in FIG. 1B), FIG. 2D illustrates a bottom, front, left perspective view of the base portion 102 of FIG. 1A, and FIG. 2E illustrates the retention device 226 of the base portion 102 of FIG. 1A. The embodiments of the base portion 102 of FIGS. 2A-2E are discussed together.

In the illustrated embodiments of FIGS. 2A-2E, the base portion 102 comprises a central region 200 having a bottom surface 202, a bottom edge 204, and an outer sidewall 206. In the illustrated embodiments, the outer sidewall 206 includes an interior surface 208 and an exterior surface 210. The interior surface 208 and the exterior surface 210 are spaced apart to define a recess 212 (FIG. 2C). The recess 212 can be sized based on a desired width of the base portion 102. In some embodiments, the base portion 102 includes supports 214 that are positioned in the recess 212 to couple the interior surface 208 and the exterior surface 210.

The base portion 102 of the illustrated embodiments includes a coupling mechanism 216 that is formed on the bottom surface 202 and the interior surface 208 of the outer sidewall 206. The coupling mechanism 216 includes a back support 218, one or more side supports 220, one or more ribs 222, and one or more walls 224. The coupling mechanism 216 is utilized to couple the adapter 106 (FIG. 1A) to the base portion 102, as discussed in more detail below.

The base portion 102, in particular the outer sidewall 206, includes a portion 225 having a shape. In the illustrated embodiments, the shape of the portion 225 is concave. However, the shape can be convex or any other type of shape (e.g., triangular, rectangular, etc.).

The base portion 102 of the illustrated embodiments includes at least one retention device 226 on the bottom surface 202. The retention device 226 includes a first protrusion 228, a second protrusion 230, and a third protrusion 232. The first protrusion 228 and the second protrusion 230 operate in a similar manner (e.g., the second protrusion 230 mirrors the structure of the first protrusion 228). The first protrusion 228 includes a first end 234 and a second end 236. In the illustrated embodiment, the first end 234 is coupled to the bottom surface 202. The second end 236 of the first protrusion 228 includes a rib 238 that extends along an axis 240 of the retention device 226 approximately half the length of the first protrusion 228. A rear portion 242 of the first protrusion 228 is coupled to the third protrusion 232. In the illustrated embodiment, the third protrusion 232 is approximately half the height of the first protrusion 228. The rib 238 of the first protrusion 228 (and the rib 238 of the second protrusion 230) and the third protrusion 232 define an opening 244. In the illustrated embodiment, the ribs 238 are spaced apart a first distance 246, and the first protrusion 228 and the second protrusion 230 are spaced apart a second distance 248. The first distance 246 and the second distance 248 are different and define a retention feature (e.g., a snap fit connection).

Returning to FIG. 2D, in some embodiments, the outer sidewall 206 is sized to elevate the bottom surface 202 away from the bottom edge 204 (e.g., the bottom edge 204 of the outer sidewall 206). For example, the bottom edge 204 is adapted to extend beyond the bottom surface 202 of the of the base portion 102, thereby elevating the bottom surface 202 as shown in FIG. 2C. In some embodiments when the dispenser 100 (FIG. 1A) is supported by a support surface (e.g., a table, floor, etc.), the support surface is closer to the bottom edge 204 of the outer sidewall 206 of the base portion 102 than the bottom surface 202 of the central region 200 of the base portion 102.

Figure 3A:
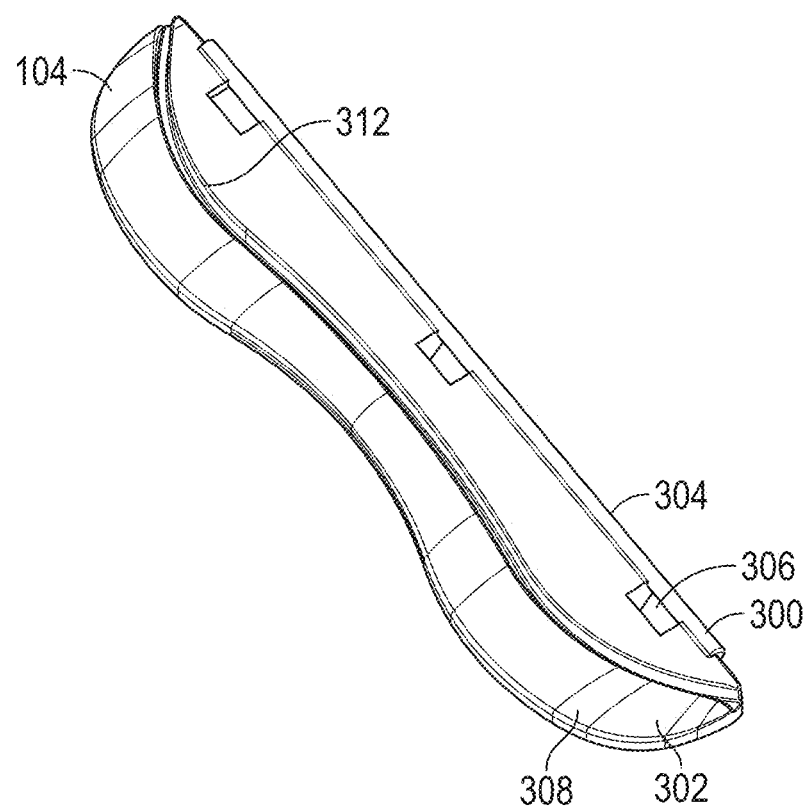
FIG. 3A illustrates a top perspective view of the stabilization mechanism of FIG. 1A, according to an embodiment.
Figure 3B:
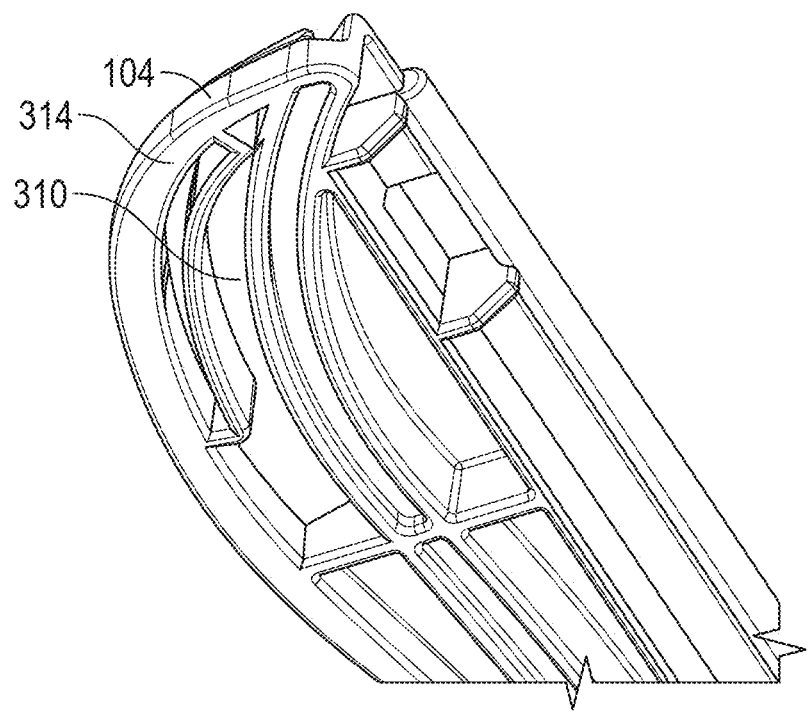
FIG. 3B illustrates a bottom view of a portion of the stabilization mechanism of FIG. 1A, according to an embodiment.

Turning to FIGS. 3A-3D, various views of the stabilizing mechanism 104 are illustrated. In particular, FIG. 3A is a top perspective view of the stabilization mechanism 104 of FIG. 1A; FIG. 3B is a bottom view of a portion of the stabilization mechanism 104 of FIG. 1A; FIG. 3C is a bottom view of a portion of the stabilization mechanism 104 of FIG. 1A coupled to the retention device 226 of FIG. 2E; and FIG. 3D is an alternate bottom view of the stabilization mechanism 104 of FIG. 1A coupled to the retention device 226 of FIG. 2E. The embodiments of the stabilization mechanism 104 of FIGS. 3A-3D are discussed together. As shown in FIGS. 1A and 1B, the dispenser 100 includes two stabilization mechanisms, each located on opposite sides (the left and right sides) of the dispenser 100. In other embodiments, a dispenser can include (a) two stabilization mechanisms located at the front and rear sides of the dispenser; and/or (b) three or more stabilization mechanisms. In some embodiments, the dispenser can include one stabilization mechanism located on either a front, rear, left, or right side of the dispenser.

In the illustrated embodiments of FIGS. 3A-3D, the stabilization mechanism 104 includes a connection element 300 and a support element 302. In the illustrated embodiment, the connection element 300 includes a rod 304 and one or more openings 306. The connection element 300 has a shape that is configured to be positioned in the opening 244 (FIG. 2E) of the retention device 226 (FIG. 2E). As shown in the illustrated embodiments, of FIGS. 3C and 3D, the rod 304 of the connection element 300 is positioned in the opening 244 and is retained in the opening 244 by the ribs 238. The ribs 238 of the first protrusion 228 are position in the opening 306 of the connection element 300 to enable the stabilization mechanism 104 (FIG. 1A) to rotate about the axis 240 (FIG. 2E). The stabilization mechanism 104 (FIG. 1A) rotates approximately 180 degrees around the axis 240 (FIG. 2E) defined by the retention device 226 (FIG. 2E). In particular, the stabilization mechanism 104 (FIG. 1A) is operable between a retracted position and a deployed position. In the retracted position, the stabilization mechanism 104 (FIG. 1A) rotates to position the stabilization mechanism 104 (FIG. 1A) under the bottom surface 202 (FIG. 2A) and covered by the outer sidewall 206 (FIG. 2A) so that the stabilization mechanism 104 (FIG. 1A) is not visible when bottom edge 204 (FIG. 2A) supports dispenser 100 (FIG. 1A) over a support surface. In the deployed position, the stabilization mechanism 104 (FIG. 1A) rotates to position the stabilization mechanism 104 (FIG. 1A) in the deployed position and partially outside of the outer sidewall 206 (FIG. 2A), as shown in FIG. 1B, so that the stabilization mechanism 104 (FIG. 1A) can expand a footprint of the dispenser 100 (FIG. 1A) to provide improved stability for the dispenser 100 (FIG. 1A) compared to when the stabilization mechanism 104 (FIG. 1A) is in the retracted position underneath bottom surface 202 (FIG. 2D).

The support element 302 of the stabilization mechanism 104 (FIG. 1A) includes a top surface 308 and a bottom surface 310. The top surface 308 includes a recess 312. In the embodiments disclosed herein, the outer sidewall 206 (FIG. 2A), includes the portion 225 (FIG. 2B) having a shape and the recess 312 has a complimentary shape in which to position the bottom end of the portion 225 (FIG. 2B) of the outer sidewall 206 (FIG. 2A) when the stabilization mechanism 104 (FIG. 1A) is in the deployed position. Turning to FIGS. 3C and 3D, the stabilization mechanism 104 (FIG. 1A) is in the deployed position, and the bottom end of the portion 225 (FIG. 2B) of the outer sidewall 206 (FIG. 2A) is positioned in the recess 312.

In some embodiments, the stabilization mechanism 104 (FIG. 1A) contacts the support surface (e.g., table, floor, etc.). For example, the stabilization mechanism 104 (FIG. 1A) supports the base portion 102 (FIG. 1A) above the support surface when the stabilization mechanism 104 (FIG. 1A) is in the deployed position such that the base portion 102 (FIG. 1A) does not contact the support surface when the stabilization mechanism 104 (FIG. 1A) is in the deployed position. In the above embodiment, the height of the dispenser 100 (FIG. 1A) is increased when the stabilization mechanism 104 (FIG. 1A) is in the deployed position. In other embodiments, the height of the dispenser 100 (FIG. 1A) is not increased when the stabilization mechanism 104 (FIG. 1A) is in the deployed position. For example, the outer sidewall 206 (FIG. 2A) can have a recess or opening in which the stabilization mechanism 104 (FIG. 1A) fits when in the deployed position. In this embodiment, when the stabilization mechanism 104 (FIG. 1A) is in the deployed position, both the stabilization mechanism 104 (FIG. 1A) and the bottom edge 204 of the outer sidewall 206 (FIG. 2A) can contact the support surface.

The bottom surface 310 includes a housing 314 for the retention mechanism 118. In the illustrated embodiment, the retention mechanism 118 is a rubber stop. In many embodiments, bottom surface 310 can have multiple housings and retention mechanisms. In some embodiments, the retention mechanism 118 contacts the support surface (e.g., table, floor, etc.). For example, the retention mechanism 118 supports the base portion 102 (FIG. 1A) above the support surface when the stabilization mechanism 104 (FIG. 1A) is in the deployed position such that the base portion 102 (FIG. 1A) does not contact the support surface when the stabilization mechanism 104 (FIG. 1A) is in the deployed position. The higher friction surface of the retention mechanism 118 (compared to the lower friction surfaces of the base portion 102 and other portions of the stabilization mechanism 104 (FIG. 1A)) further mitigates lateral movement of the dispenser 100 (FIG. 1A). In some embodiments, the retention mechanism 118 and/or the stabilization mechanism 104 (FIG. 1A) are weighted to provide additional support beyond expanding the footprint of the dispenser 100 (FIG. 1A).

Figure 4B:
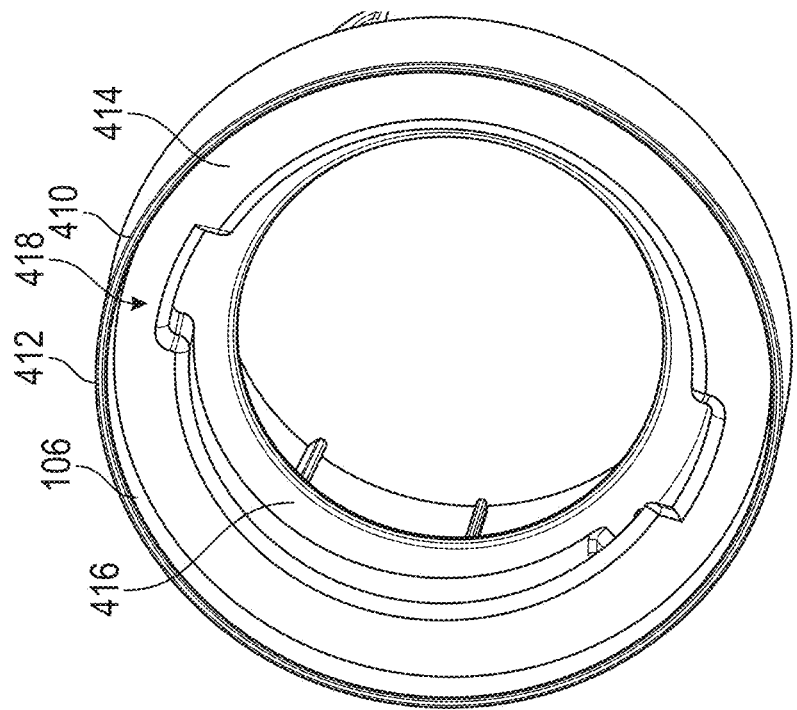
FIG. 4B illustrates a top, front, right perspective view of the adapter of FIG. 1A, according to an embodiment.
Figure 4A:
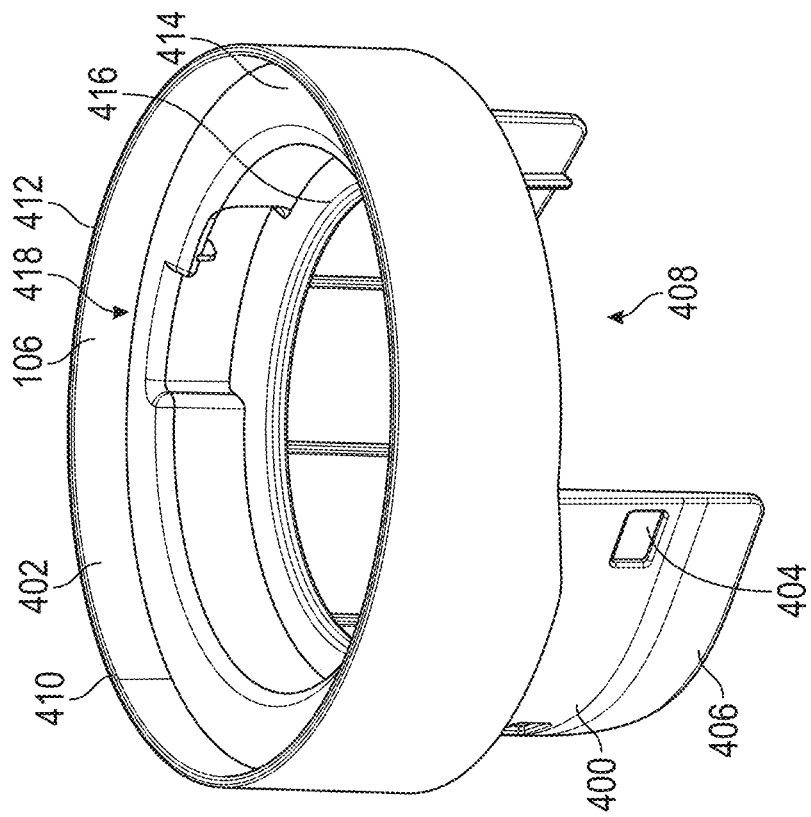
FIG. 4A illustrates a top, front, left perspective view of the adapter of FIG. 1A, according to an embodiment.
Figure 4C:
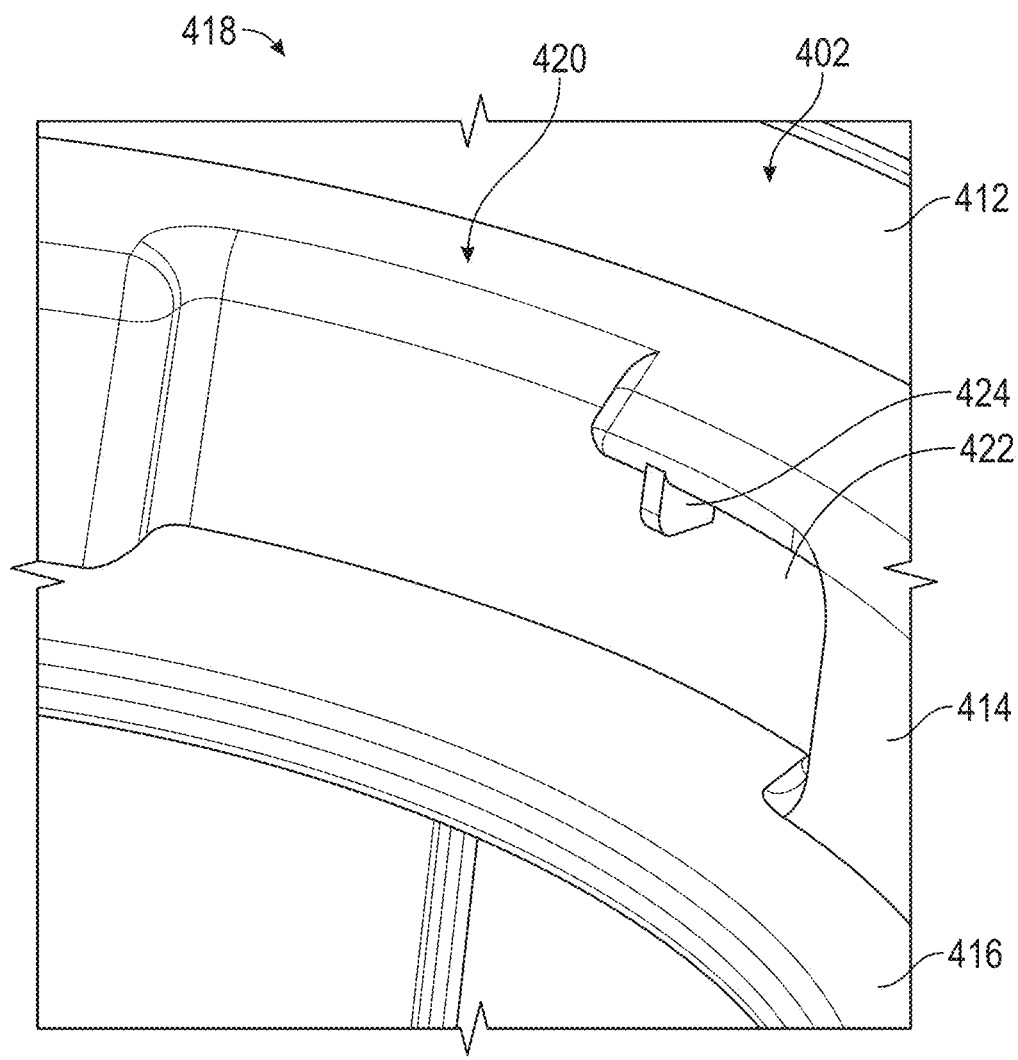
FIG. 4C illustrates a view of an upper portion of the coupling mechanism of the adapter of FIG. 1A, according to an embodiment.

Turning to FIGS. 4A-4C, various views of the adapter 106 (FIG. 1A) are illustrated. In particular, FIG. 4A illustrates a top, front, left perspective view of the adapter of FIG. 1A; FIG. 4B illustrates a top, front, right perspective view of the adapter of FIG. 1A; and FIG. 4C illustrates a view of an upper portion of the coupling mechanism of the adapter of FIG. 1A. The embodiments of the adapter 106 (FIG. 1A) of FIGS. 4A-4C are discussed together.

In the illustrated embodiments of FIGS. 4A-4C, the adapter 106 includes an exterior surface 400 and an interior surface 402. The exterior surface 400 of the adapter 106 (FIG. 1A) includes a first coupling mechanism 404. In the illustrated embodiments, the first coupling mechanism 404 comprises one or more recesses on the exterior surface 400 of the adapter 106 (FIG. 1A). The first coupling mechanism 404 is adapted to receive the one or more ribs 222 (FIG. 2B) of the coupling mechanism 216 (FIG. 2B) of the base portion 102 (FIG. 1A) to couple the adapter 106 (FIG. 1A) to the base portion 102 (FIG. 1A). The adapter 106 (FIG. 1A) of the illustrated embodiments comprises a sidewall portion 406 that defines an opening 408. The sidewall portion 406 is positioned adjacent a rear surface of the back support 218 (FIG. 2B) and a rear surface of the one or more side supports 220 (FIG. 2B), as shown in the illustrated embodiments of FIGS. 7A and 7B. The one or more walls 224 (FIG. 2B) are adapted to abut the sidewall portion 406 to further retain the adapter 106 (FIG. 1A).

In the illustrated embodiments, the adapter 106 (FIG. 1A) includes an upper portion 410 that includes a first annular shoulder 412, a second annular shoulder 414, and a third annular shoulder 416. The second annular shoulder 414 includes a second coupling mechanism 418. As shown in FIG. 4C, the second coupling mechanism 418 includes an opening 420, a housing 422, and a lip 424. The second coupling mechanism 418 is adapted to couple the adapter 106 (FIG. 1A) to the container 108 (FIG. 1A).

Turning to FIG. 5A, a side view of a bottom portion of the container 108 is illustrated. In the illustrated embodiment of FIG. 5A, the container 108 includes an inner surface 500 (e.g., internal portion of the container 108), and an outer surface 502. In the illustrated embodiment of FIG. 5A, the outer surface 502 includes a first coupling mechanism 504 and a second coupling mechanism 506. The first coupling mechanism 504 comprising protrusions 508. In some embodiments, the container 108 (FIG. 1A) is positioned such that the protrusions 508 positioned in the opening 420 (FIG. 4C), the container 108 (FIG. 1A) is then rotated to position the protrusions 508 in the housing 422 (FIG. 4C), thereby coupling the container 108 (FIG. 1A) to the adapter 106 (FIG. 1A), and the lip 424 (FIG. 4C) retains the protrusions 508. In the illustrated embodiment of FIG. 5A, the second coupling mechanism 506 is utilized to couple the dispenser mechanism 110 (FIG. 1A) to the container 108 (FIG. 1A). The container 108 of the illustrated embodiment if FIG. 5A is utilized to dispense liquids, not solid food.

FIG. 5B illustrates a side view of an alternative embodiment of a bottom portion of the container 108 that is utilized to dispense solid food, not liquids. In the illustrated embodiment of FIG. 5B, the container 108 does not include the second coupling mechanism 506 (and, therefore, is not attached to the dispenser mechanism 110 (FIG. 1A), thereby enabling the opening adjacent the first coupling mechanism 508 to be larger for solid food to pass through during operation (e.g., when the container 108 is coupled to the adapter 106). The second coupling mechanism 506 in FIG. 5A is a threaded connection and is adapted to couple the dispenser mechanism 110 (FIG. 1A) to the container 108 (FIG. 1A).

Figure 6:
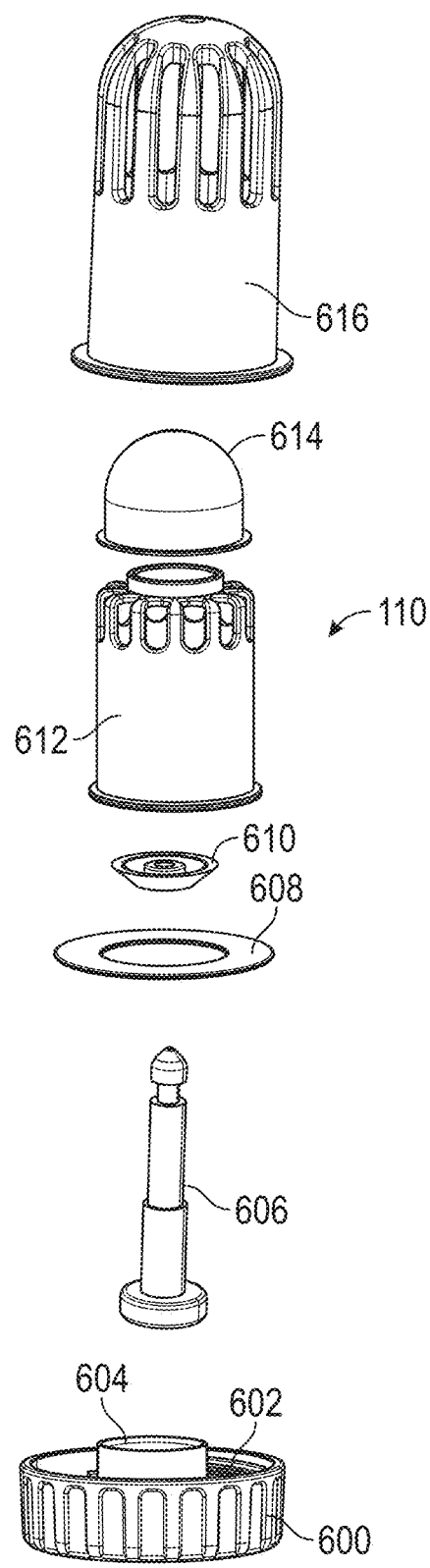
FIG. 6 illustrates an exploded view of the dispenser mechanism of FIG. 1A, according to an embodiment.

Turning to FIG. 6, an exploded view of the dispenser mechanism 110 (FIG. 1A) is illustrated. The dispenser mechanism 110 of the illustrated embodiment includes a cap base 600 including a recess 602 and an opening 604, a stem 606 positioned in the opening 604, a seal 608 positioned in the recess 602, a silicone seal 610 coupled to upper end of the stem 606, a seal cover 612 positioned in the recess 602 over the seal 608, a filter 614 positioned on the seal cover 612, and a housing 616 positioned in the recess 602 over the seal cover 612. The housing 616 is adapted to retain the stem 606, the seal 608, the silicone seal 610, the seal cover 612, and the filter 614. In some embodiments, the stem 606, the seal 608, the silicone seal 610, the seal cover 612, the filter 614, and the housing 616 are positioned in the internal portion (e.g., adjacent inner surface 500) of the container 108 (FIG. 1A). The recess 602 includes a complimentary threaded connection to enable the dispensing mechanism 110 (FIG. 1A) to be coupled to the second coupling mechanism 506 (FIG. 5A) of the container 108 (FIG. 1A).

Figure 7A:
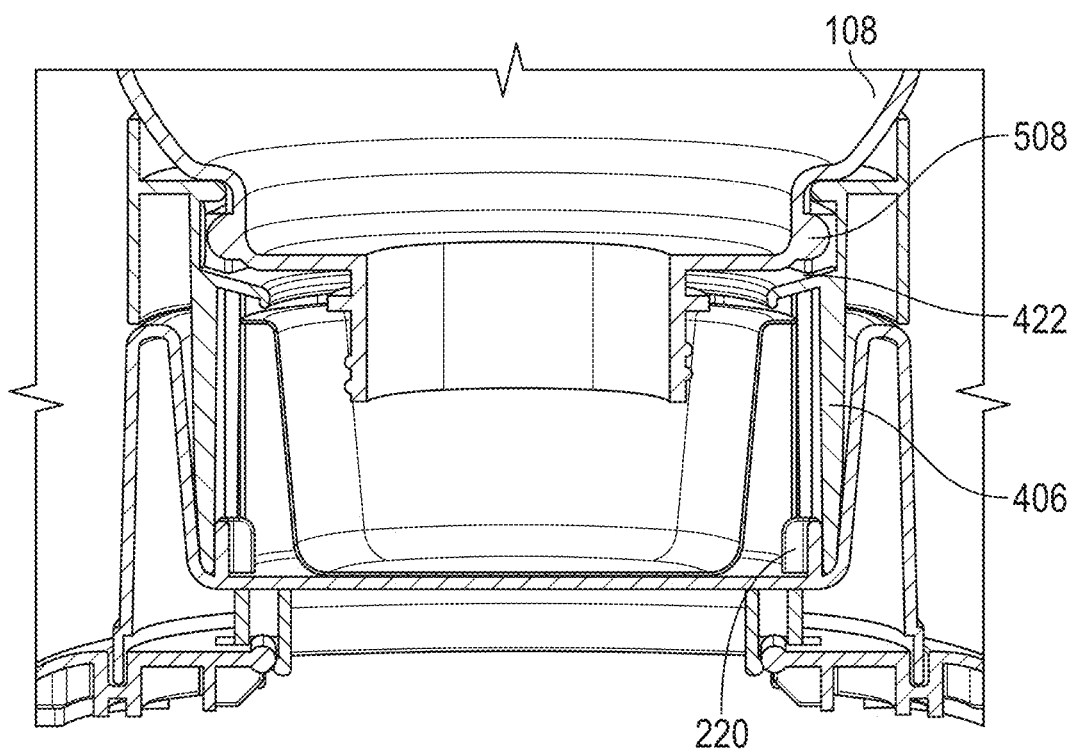
FIG. 7A illustrates a cross section of a portion of the dispenser of FIG. 1B (as partially assembled) along section line BB (shown in FIG. 1B), according to an embodiment that uses the embodiment of the container in FIG. 5A.
Figure 7B:
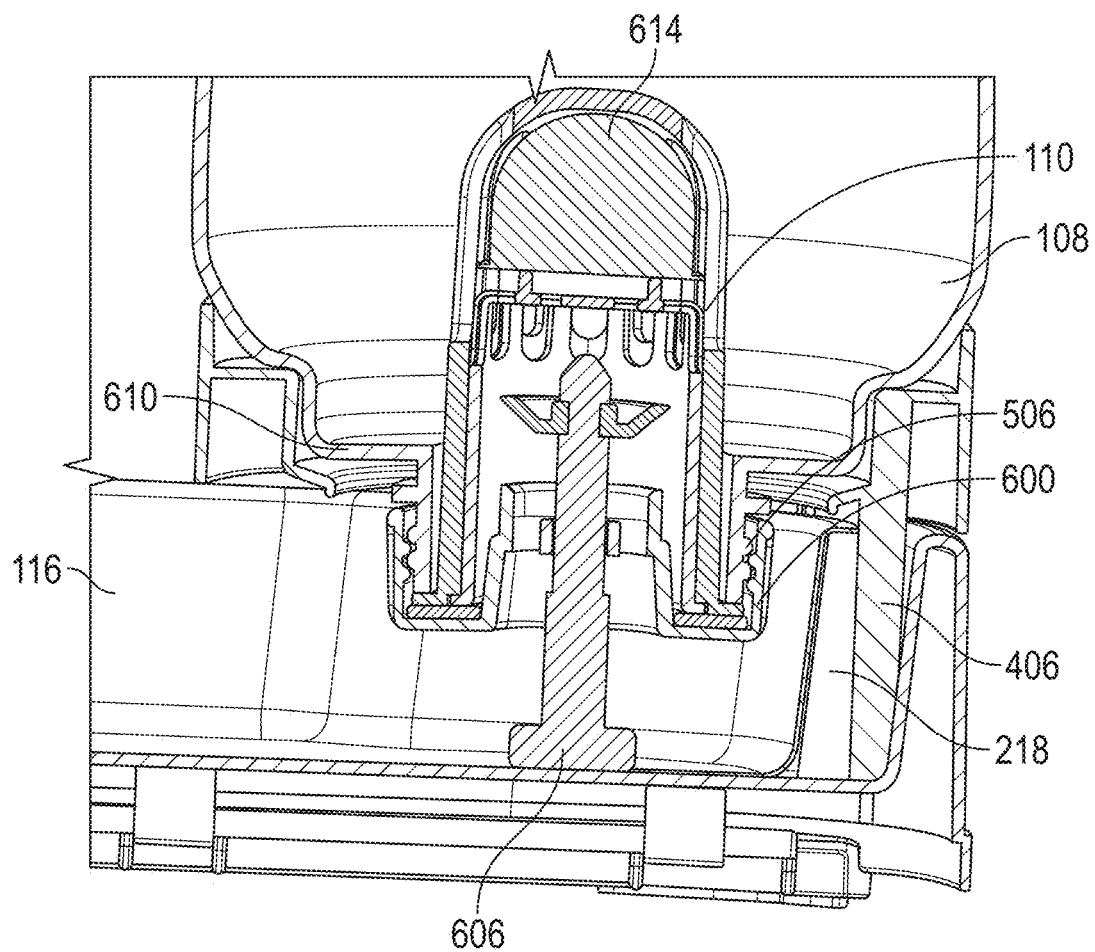
FIG. 7B illustrates another cross section of a portion of the dispenser of FIG. 1B (as fully assembled) along section AA (shown in FIG. 1B), according to an embodiment that uses the embodiment of the container in FIG. 5A and also uses the dispenser mechanism.

Turning briefly to FIGS. 7A and 7B, FIG. 7A is an illustration of a cross section of a portion of the dispenser of FIG. 1B (as partially assembled) along section line BB (shown in FIG. 1B), and FIG. 7B is an illustration of another cross section of a portion of the dispenser of FIG. 1B (as fully assembled) along section AA (shown in FIG. 1B), according to an embodiment that uses the embodiment of the container in FIG. 5A and also uses the dispenser mechanism. Turning briefly to FIG. 7B, during operation the stem 606 engages the tray 116 to disengage the silicone seal 610 to enable liquid in the container 108 to pass through the filter 614 to fill the tray 116 with the liquid for a pet.

Figures 8, 9:
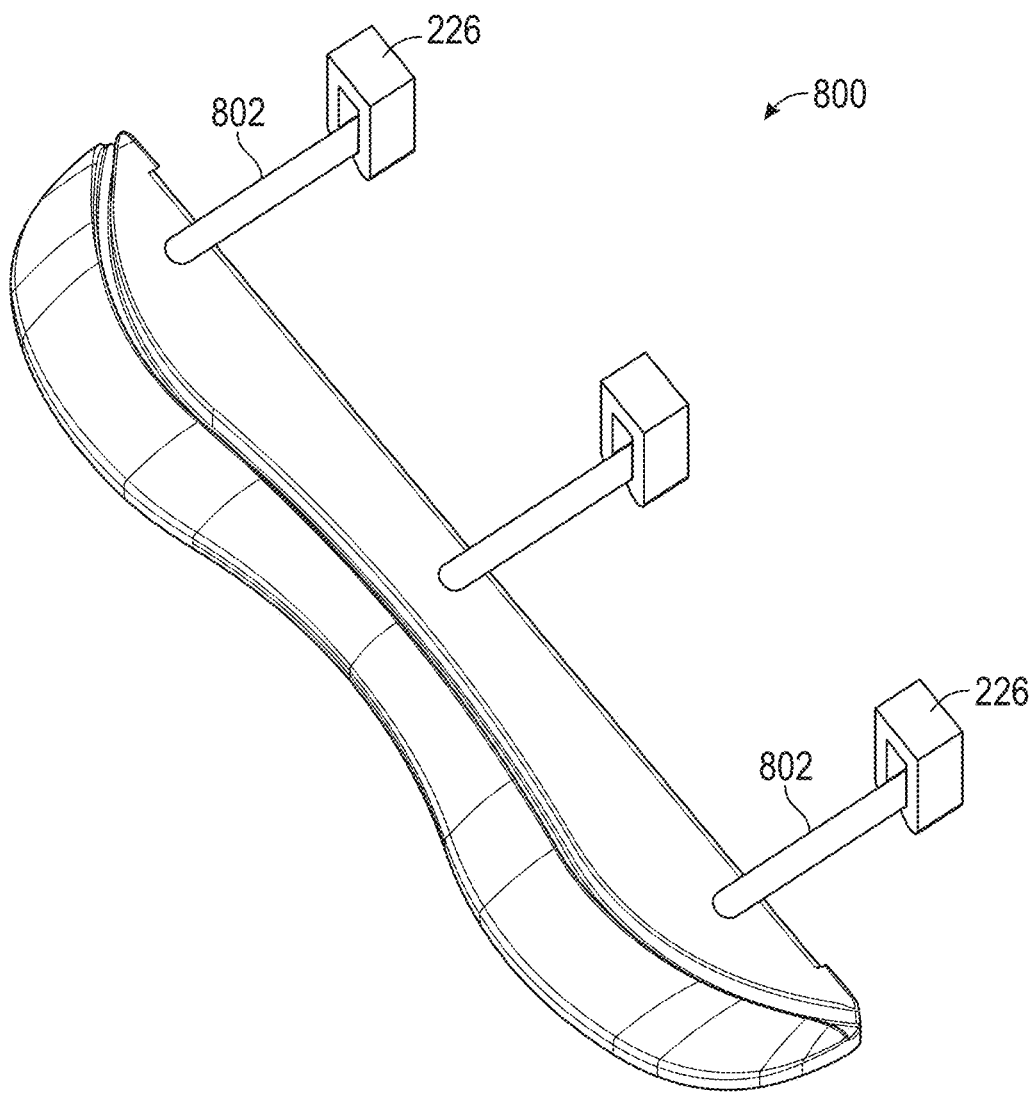
FIG. 8 illustrates an alternative stabilization mechanism, according to an embodiment.
FIG. 9 illustrates a flow chart of a method for manufacturing an apparatus, according to an embodiment.

Turning to FIG. 8, an alternative stabilization mechanism 800 is illustrated. Compared to the use of the stabilization mechanism 104 (FIGS. 3A, 3B), when the alternative stabilization mechanism 800 is used, the retention device 226 (FIG. 2E) is rotated 90 degrees and are located closer to a central portion of bottom surface 202 (FIG. 2D), and the rod 304 (FIG. 3A) of the connection element 300 (FIG. 3A) is split into three separate rails 802 that slide along the axis 240 (FIG. 2E) of the retention device 226 (FIG. 2E). In this embodiment, the stabilization mechanism 800 slides along the retention device 226 (FIG. 2E) via the rails 802 to transition the stabilization mechanism 800 between (a) a deployed position where the stabilization mechanism 800 is positioned outside of base portion 102 (FIG. 1A) and (b) a retracted position where the stabilization mechanism 800 is positioned under the bottom surface 202 (FIG. 2A) of the base portion 102 (FIG. 1A).

FIG. 9 illustrates a flowchart of a method (900) for manufacturing an apparatus (e.g., dispenser 100 (FIG. 1), according to certain embodiments. As an example, the dispenser manufactured using the method 900 can be similar or identical to the dispenser 100 (FIG. 1).

In a number of embodiments, the method 900 can include providing a base portion comprising a retention device including at least one opening (block 902). For example, providing the base portion 102 (FIG. 1A) comprising the retention device 226 (FIG. 2E) including the opening 244 (FIG. 2E). In some embodiments, the base portion can be made of plastic and can be formed by injection molding.

In a number of embodiments, the method 900 can include providing at least one stabilization mechanism, wherein each of the at least one stabilization mechanism comprises a connection element and a support element (block 904). For example, providing the stabilization mechanism 104 (FIG. 1A), wherein the stabilization mechanism 104 (FIG. 1A) comprises a connection element 300 (FIG. 3A) and a support element 302 (FIG. 3A). In some embodiments, the connection element 300 (FIG. 3A) has a shape configured to be positioned in the at least one opening 244 (FIG. 2E), and the at least one stabilization mechanism 302 (FIG. 3A) provides stability for the apparatus when the at least one stabilization mechanism 104 (FIG. 1A) is deployed to a first position to expand a footprint of the apparatus. In some embodiments, the stabilization mechanism can be made of plastic (except for the retention mechanism (when included as part of the stabilization mechanism), which can be made of rubber) and can be formed by injection molding.

Although stabilization mechanisms have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any components of the stabilization mechanism disclosed herein, as well as the steps to manufacture the stabilization mechanism, may be modified, and that the foregoing discussion of certain of these embodiments does not necessarily represent a complete description of all possible embodiments. As another example, although FIGS. 2E and 8 show three retention devices per side of the base portion, one of ordinary skill in the art will understand that the dispenser can include a greater or less number of such retention devices, and also can have the same or different number of such retention devices per side.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. An apparatus comprising:
    a base portion comprising a retention device including at least one opening; and
    at least one stabilization mechanism;
    wherein:
        each of the at least one stabilization mechanism comprises a connection element and a support element, wherein the connection element has a shape configured to be positioned in the at least one opening; and
        the at least one stabilization mechanism provides stability for the apparatus when the at least one stabilization mechanism is deployed from a second position to a first position to expand a footprint of the apparatus, and is not visible when retracted from the first position to the second position and when the base portion is supported over a support surface.

2. The apparatus of claim 1, wherein:
    the base portion further comprises:
        an outer sidewall having a bottom edge; and
        a central region having a bottom surface; and
    when the apparatus is supported by the support surface, the support surface is closer to the bottom edge of the outer sidewall of the base portion than the bottom surface of the central region of the base portion.

3. The apparatus of claim 2, wherein:
    the outer sidewall includes a first portion having a shape;
    the at least one stabilization mechanism includes a top surface having a recess; and
    the recess has a complimentary shape in which to position the first portion of the outer sidewall when the at least one stabilization mechanism is deployed to the first position.

4. The apparatus of claim 1, wherein the at least one stabilization mechanism contacts the support surface for the apparatus when the at least one stabilization mechanism is deployed to the first position.

5. The apparatus of claim 4, wherein the at least one stabilization mechanism supports the base portion above the support surface when the at least one stabilization mechanism is deployed to the first position such that the base portion does not contact the support surface when the at least one stabilization mechanism is deployed to the first position.

6. The apparatus of claim 1, wherein the base portion remains at a constant height relative to the support surface regardless of whether the at least one stabilization mechanism is deployed to the first position or is retracted to the second position.

7. The apparatus of claim 1, wherein at least one of:
    a height of the apparatus is increased when the at least one stabilization mechanism is deployed from the second position to the first position; or
    the at least one stabilization mechanism rotates approximately 180 degrees around an axis defined at least in part by the retention device.

8. The apparatus of claim 1, wherein:
    the support element of each of the at least one stabilization mechanism moves through the at least one opening to deploy the at least one stabilization mechanism into the first position; and
    the connection element is positioned in the at least one opening when the at least one stabilization mechanism is in the first position.

9. The apparatus of claim 1, wherein the apparatus is supported by the support surface when the at least one stabilization mechanism is retracted in the second position.

10. The apparatus of claim 1, further comprising:
    an adapter positioned over the base portion; and
    a container coupled to the adapter, the container configured to retain a food or a liquid for a pet.

11. The apparatus of claim 10, wherein:
    the apparatus further comprises a dispenser mechanism;
    the container comprises an inner surface, an outer surface, a first coupling mechanism at the outer surface of the container, and a second coupling mechanism at the outer surface of the container;
    the first coupling mechanism is coupled to the adapter; and
    the second coupling mechanism is coupled to the dispenser mechanism.

12. The apparatus of claim 10, wherein:
    the base portion comprises an outer sidewall having an interior surface and a coupling mechanism;
    the coupling mechanism of the outer sidewall is located at the interior surface of the outer sidewall;
    the adapter comprises an outer exterior surface and a coupling mechanism;
    the coupling mechanism of the adapter is located at the outer exterior surface of the adapter; and
    when the adapter is positioned over the base portion, the coupling mechanisms of the outer sidewall is coupled to the coupling mechanism of the adapter.

13. A method of manufacturing an apparatus, the method comprising:
    providing a base portion comprising a retention device including at least one opening; and
    providing at least one stabilization mechanism;
    wherein:
        each of the at least one stabilization mechanism comprises a connection element and a support element, wherein the connection element has a shape configured to be positioned in the at least one opening; and
        the at least one stabilization mechanism provides stability for the apparatus when the at least one stabilization mechanism is deployed from a second position to a first position to expand a footprint of the apparatus, and is not visible when retracted from the first position to the second position and when the base portion is supported over a support surface.

14. The method of claim 13, wherein:
    the method further comprises providing the base portion with:

an outer sidewall having a bottom edge; and
a central region having a bottom surface; and
when the apparatus is supported by the support surface, the support surface is closer to the bottom edge of the outer sidewall of the base portion than the bottom surface of the central region of the base portion.

15. The method of claim 14, further comprising:
providing the outer sidewall with a first portion having a shape;
providing the at least one stabilization mechanism with a top surface having a recess; and
providing the recess with a complimentary shape in which to position the first portion of the outer sidewall when the at least one stabilization mechanism is deployed to the first position.

16. The method of claim 13, further comprising:
providing an adapter positioned over the base portion; and
providing a container coupled to the adapter, the container configured to retain a food or a liquid for a pet.

17. The method of claim 16, further comprising providing a dispenser mechanism adapted to filter the liquid and dispense the liquid in an engaged position.

18. The method of claim 17, further comprising:
providing the container with an inner surface, an outer surface, a first coupling mechanism at the outer surface of the container, and a second coupling mechanism at the outer surface of the container;
the first coupling mechanism is coupled to the adapter; and
the second coupling mechanism is coupled to the dispenser mechanism.

19. The method of claim 16, wherein:
providing the base portion with an outer sidewall having an interior surface and a coupling mechanism; and
the coupling mechanism of the outer sidewall is located at the interior surface of the outer sidewall.

20. The method of claim 19, wherein:
providing the adapter with an outer exterior surface and a coupling mechanism;
the coupling mechanism of the adapter is located at the outer exterior surface of the adapter; and
when the adapter is positioned over the base portion, the coupling mechanisms of the outer sidewall is coupled to the coupling mechanism of the adapter.

21. The method of claim 13, wherein:
the base portion remains at a constant height relative to the support surface regardless of whether the at least one stabilization mechanism is deployed to the first position or is retracted to the second position.

22. The method of claim 13, wherein at least one of:
a height of the apparatus is increased when the at least one stabilization mechanism is deployed from the second position to the first position; or
the at least one stabilization mechanism rotates approximately 180 degrees around an axis defined at least in part by the retention device.

* * * * *